Figure 1:
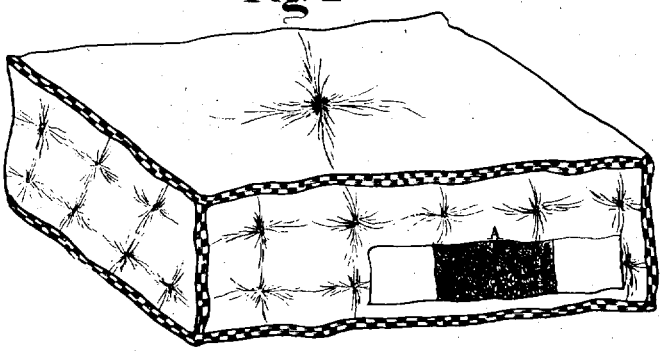

F. A. LANE.

Stuffing for Mattresses, &c.

No. 5,266. Reissued Feb. 4, 1873.

Witnesses.

D. S. Critchfield

A. F. Cornell.

Inventor.

Frederick A. Lane.

Per. Burridge & Co.

Attys. Cleveland. Ohio.

UNITED STATES PATENT OFFICE.

FREDERICK A. LANE, OF CLEVELAND, OHIO, ASSIGNOR, BY MESNE ASSIGNMENTS, TO HIMSELF, LUTHER S. LANE, AND EPHRAIM KENDALL.

IMPROVEMENT IN STUFFING FOR MATTRESSES.

Specification forming part of Letters Patent No. 90,368, dated May 25, 1869; reissue No. 5,266, dated February 4, 1873.

*To all whom it may concern:*

Be it known that I, FREDERICK A. LANE, of Cleveland, in the county of Cuyahoga and State of Ohio, have invented or produced a new and Improved Stuffing for Mattresses, &c.; and I do hereby declare that the following is a full and exact description thereof.

The nature of this invention consists in providing a new and improved article made from woolen fibers of refuse woolen goods, rags, &c., to be applied to stuffing purposes of all kinds, which may be bunched or curled up to render it less liable to pack or mat down than when used in its open and free fibrous state.

The article stuffed will have a certain amount of elasticity, according to the condition or amount of curling or bunching of the fiber.

To enable others skilled in the art to make and use my invention, I will proceed to describe the same, how prepared and applied.

Figure 1 represents a perspective view of a mattress, with parts removed, showing the application of my improved article, A being the woolen fiber, which is homogeneous or uniform in character.

The woolen fiber applied to stuffing is made from waste and refuse woolen goods, rags, druggets, &c. When the fiber is to be used, curled, and bunched, the said refuse is made to pass through the different kinds of operation requisite to convert the same into shoddy or open and free fiber. This mass of woolen fibers is then passed through what is termed a duster, which completely removes the dust and dirt. The dust may be removed otherwise therefrom.

In curling and bunching this mass of woolen fiber it is passed through the duster at such speed that the fibers are curled and bunched, more or less, as desired; the more curl and bunching it has the better the article produced, giving the same more elasticity.

This fiber may be used for stuffing purposes of all kinds, and the bunching and curling thereof serving for the same purpose as the curl and crisp to hair, giving the article stuffed the required elasticity, preventing it from matting; and when the weight is removed from the same the article stuffed will resume its former and finished position.

Thus I am enabled to produce an article that can be used and applied for stuffing purposes, which is nearly equal in quality and durability to curled hair, and can be furnished at a much cheaper rate, and will supply the wants of the public, while it will come within the reach of every one.

*Claim.*

What I claim as my invention, and desire to secure by Letters Patent, is—

The prepared homogeneous woolen fiber for stuffing, bedding, upholstering, &c., when made from the waste or refuse of woolen goods, rags, &c., and by separating the woven or interlocking fibers thereof, and rendering them free and open, substantially as set forth.

FREDERICK A. LANE.

Witnesses:
THOMAS C. CONNOLLY,
J. J. COOMBS.